(12) United States Patent
Brent (10) Patent No.: US 9,480,087 B2
(45) Date of Patent: Oct. 25, 2016

(54) METHOD AND APPARATUS FOR PUBLIC SAFETY ANSWERING POINT (PSAP) DISCREET ALERT SYSTEM

(75) Inventor: Kenneth W. Brent, Murphy, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 520 days.

(21) Appl. No.: 13/409,817

(22) Filed: Mar. 1, 2012

(65) Prior Publication Data

US 2013/0229282 A1 Sep. 5, 2013

(51) Int. Cl.
| | |
|---|---|
| *G08B 21/00* | (2006.01) |
| *H04W 76/00* | (2009.01) |
| *H04M 3/42* | (2006.01) |
| *H04M 3/51* | (2006.01) |
| *G08B 25/00* | (2006.01) |
| *H04W 4/22* | (2009.01) |
| *H04W 4/00* | (2009.01) |
| *H04W 4/02* | (2009.01) |
| *H04W 4/12* | (2009.01) |
| *G08B 25/01* | (2006.01) |

(52) U.S. Cl.
CPC .......... *H04W 76/007* (2013.01); *G08B 25/006* (2013.01); *G08B 25/016* (2013.01); *H04M 3/42382* (2013.01); *H04M 3/5116* (2013.01); *H04W 4/021* (2013.01); *G08B 25/014* (2013.01); *H04M 2203/2094* (2013.01); *H04W 4/005* (2013.01); *H04W 4/02* (2013.01); *H04W 4/12* (2013.01); *H04W 4/22* (2013.01)

(58) Field of Classification Search
CPC .................. H04M 2203/2094; H04M 3/5116; H04M 3/42068; H04M 3/42348; H04M 3/42382; H04W 4/02; H04W 4/005; H04W 4/021; H04W 4/12; H04W 4/22; H04W 76/007

USPC .......................... 340/540; 455/404.2; 379/45
See application file for complete search history.

(56) References Cited

U.S. PATENT DOCUMENTS

| | | | | |
|---|---|---|---|---|
| 5,239,570 | A * | 8/1993 | Koster ................ | H04M 3/4228 379/279 |
| 5,689,548 | A * | 11/1997 | Maupin .................. | H04M 3/48 379/45 |
| 6,771,742 | B2 * | 8/2004 | McCalmont et al. .......... | 379/45 |
| 7,580,405 | B2 * | 8/2009 | Laliberte ....................... | 370/389 |
| 8,014,341 | B1 * | 9/2011 | Ray .......................... | H04W 4/22 370/328 |
| 8,050,386 | B2 * | 11/2011 | Dickinson ....................... | 379/45 |
| 8,538,374 | B1 * | 9/2013 | Haimo et al. .............. | 455/404.2 |
| 2005/0123102 | A1 * | 6/2005 | Beason ................ | H04M 7/006 379/45 |
| 2005/0282518 | A1 * | 12/2005 | D'Evelyn et al. ......... | 455/404.1 |
| 2007/0280428 | A1 * | 12/2007 | McClelland .................... | 379/37 |
| 2008/0081646 | A1 * | 4/2008 | Morin et al. .................. | 455/466 |
| 2009/0298458 | A1 * | 12/2009 | Bakker et al. ............. | 455/404.1 |
| 2010/0002846 | A1 * | 1/2010 | Ray et al. ....................... | 379/37 |

(Continued)

*Primary Examiner* — Firmin Backer
*Assistant Examiner* — Adnan Aziz
(74) *Attorney, Agent, or Firm* — Tong, Rea, Bentley & Kim, LLC (57) ABSTRACT

A method, apparatus and system for automatically generating an e911 alert are provided in a public safety answering point (PSAP) server including at least one messaging interface supporting message-based interaction with one or more user devices, wherein in response to a request for assistance message including location information associated with a user device, the PSAP server determines the emergency services resources proximate the requesting device and communicates location information associated with the requesting device toward the determined emergency services resources.

21 Claims, 7 Drawing Sheets

(56) References Cited

U.S. PATENT DOCUMENTS

| | | | |
|---|---|---|---|
| 2010/0029243 A1* | 2/2010 | Ozer | H04W 76/007 455/404.1 |
| 2010/0297980 A1* | 11/2010 | Alberth et al. | 455/404.2 |
| 2011/0026440 A1* | 2/2011 | Dunn et al. | 370/259 |
| 2011/0064205 A1* | 3/2011 | Boni et al. | 379/45 |
| 2011/0099281 A1* | 4/2011 | Bakker et al. | 709/228 |
| 2011/0189971 A1* | 8/2011 | Faccin et al. | 455/404.1 |
| 2012/0208492 A1* | 8/2012 | Tschofenig | H04M 3/5116 455/404.2 |
| 2013/0052983 A1* | 2/2013 | Fletcher et al. | 455/404.2 |

* cited by examiner

METHOD AND APPARATUS FOR PUBLIC SAFETY ANSWERING POINT (PSAP) DISCREET ALERT SYSTEM

FIELD OF THE INVENTION

The invention relates generally to communication networks and, more specifically but not exclusively, to public safety answering point (PSAP) alerting system.

BACKGROUND

All areas of the world are constantly experiencing crime, accidents, natural disasters and other emergencies. An individual can be easily faced with a situation that requires discretion in alerting municipal authorities, especially in personal crime scenarios (e.g., kidnapping, home invasion, personal assault, robbery, theft). Public emergency and law enforcement require discreet methods for locating and tracking persons of interest. Individuals and families may require a discreet means to alert municipal authorities.

While communication technology has advanced rapidly, alert notification is still dependent upon active participating in a voice call. Unfortunately, in some emergency scenarios a voice call (incoming or outgoing) can endanger victims.

SUMMARY

Various deficiencies in the prior art are addressed by embodiments for discreetly alerting municipal authorities. Specifically, in various embodiments a method, apparatus and system for automatically generating an e911 alert are provided in a public safety answering point (PSAP) server including at least one messaging interface supporting message-based interaction with one or more user devices, wherein in response to a request for assistance message including location information associated with a user device, the PSAP server determines the emergency services resources proximate the requesting device and communicates location information associated with the requesting device toward the determined emergency services resources.

BRIEF DESCRIPTION OF THE DRAWINGS

The teachings herein may be readily understood by considering the following detailed description in conjunction with the accompanying drawings, in which.

To facilitate understanding, identical reference numerals have been used, where possible, to designate identical elements that are common to the figures.

DETAILED DESCRIPTION

Generally speaking, various embodiments discussed herein provide arrangements to discreetly alert municipal authorities of an on-going personal crime or to request help in case of fire or medical emergencies. Thus, while primarily described within the context of a new methodology for implementing a wireless e911 public safety infrastructure, it will be appreciated by those skilled in the art that the invention is applicable to various wireless arrangements.

The methods, systems, apparatus and related mechanisms described herein implement a wireless e911 Public safety infrastructure broadly contemplating a client application operating within user equipment (UE) or any client device such as a mobile phone, tablet computer and the like, and one or more Public Safety Answering Point Wireless Consoles (PSAP-WC) capable of communicating with the client device as well as various other emergency services related infrastructure.

A user interacting with the client device may initiate an alert which is transmitted from the client device toward the PSAP-WC via SMS or other messaging, voice or data transmission means. The alert may include identification information, geophysical point data, global positioning system (GPS) coordinates or other location information, motion information, still or moving image data, audio data, device status, network status and so on. Client devices having differing levels of capability will necessarily provide differing levels of information.

The PSAP-WC transmits acknowledgment information, requests for additional information and/or other information toward the client device via SMS or other messaging, voice or data transmission means. For example, the PSAP-WC may request additional location information if additional location information was insufficiently accurate, audio data to provide a situational awareness and so on.

With "smart" devices of all types (e.g., navigators, GPS systems, smart phones) becoming highly available there is an opportunity to give the individual carrying such a device a discreet way to silently request assistance whether it be medical, fire, and/or police.

Various embodiments provide an e911 application that supports a handheld device. The e911 application enables the end-user to silently relay alarm by numerical code to a 911 dispatcher. The e911 application interface is pre-programmed/assigned by the end-user, but internetworking interface conveys end-user name, home address, primary/secondary telephone number(s), GPS longitude/latitude, altitude above sea level, type of emergency code, and need for a callback, and the like at predetermined time intervals such as every δ seconds, for example, every 5, 10, 15, 30 and 60 seconds.

Each of the primary/secondary telephone number(s) may have a Boolean value indicating whether a return call should be made to that number or not. The types of emergency codes are (1) Medical; (2) Fire [home, business, factory, general] and (3) Police [robbery, kidnap, assault, accident].

The e911 Center receives messages via the SMS delivery mechanism. All received information is displayed and a dispatcher notifies the appropriate service (e.g., municipal authorities, fire, medical). Information is refreshed every (δ+Δ) seconds.

Various embodiments provide an end-user with a smart handheld device to silently indicate to Public Safety the end-user has either been taken or ventured beyond a designated area to thereby alert municipal authorities. In this embodiment, a silent e911 client software application instantiated on the end-user device allows the end-user to manually or automatically send an alerting message in a predetermined format encapsulated in, illustratively, an SMS envelop to be forwarded to the PSAP server. An augmented positional format that fits within the 160 character maximum SMS envelope size is used in one embodiment. Client's applications are treated as individual delivery points. Client's applications are tied directly to e911 service or designated third-party intermediate service platforms. The end-user pre-sets desired response to emergency type. The e911 silent function can be initiated in three (3) taps minimum on handheld screen. The application enables total silence alerting.

Various embodiments provide a wireless server platform established at the Public Safety Answering Point (PSAP). This platform is equipped to receive, translate and post alert, complete with bi-directional SMS and Voice-Circuit Switched (CS), or Voice-Packet Switched (PS) capability. The server emulates a terminating point for SMS. The server is identified by one unique routing identifier. Both the client and server SMS envelope ($C_k$-SMS, $S_k$-SMS) carry bytes arranged in a specific format that is deciphered by the receiving software/suite. Both client(s) and server(s) are assigned telephone numbers to fit directly into the existing SMS infrastructure.

Various embodiments provide a server software/suite adapted to facilitate communications with multiple clients and other servers.

Various embodiments provide an end-user with a smart handheld device to silently request assistance whether it be medical, fire, and/or police.

Figure 1:
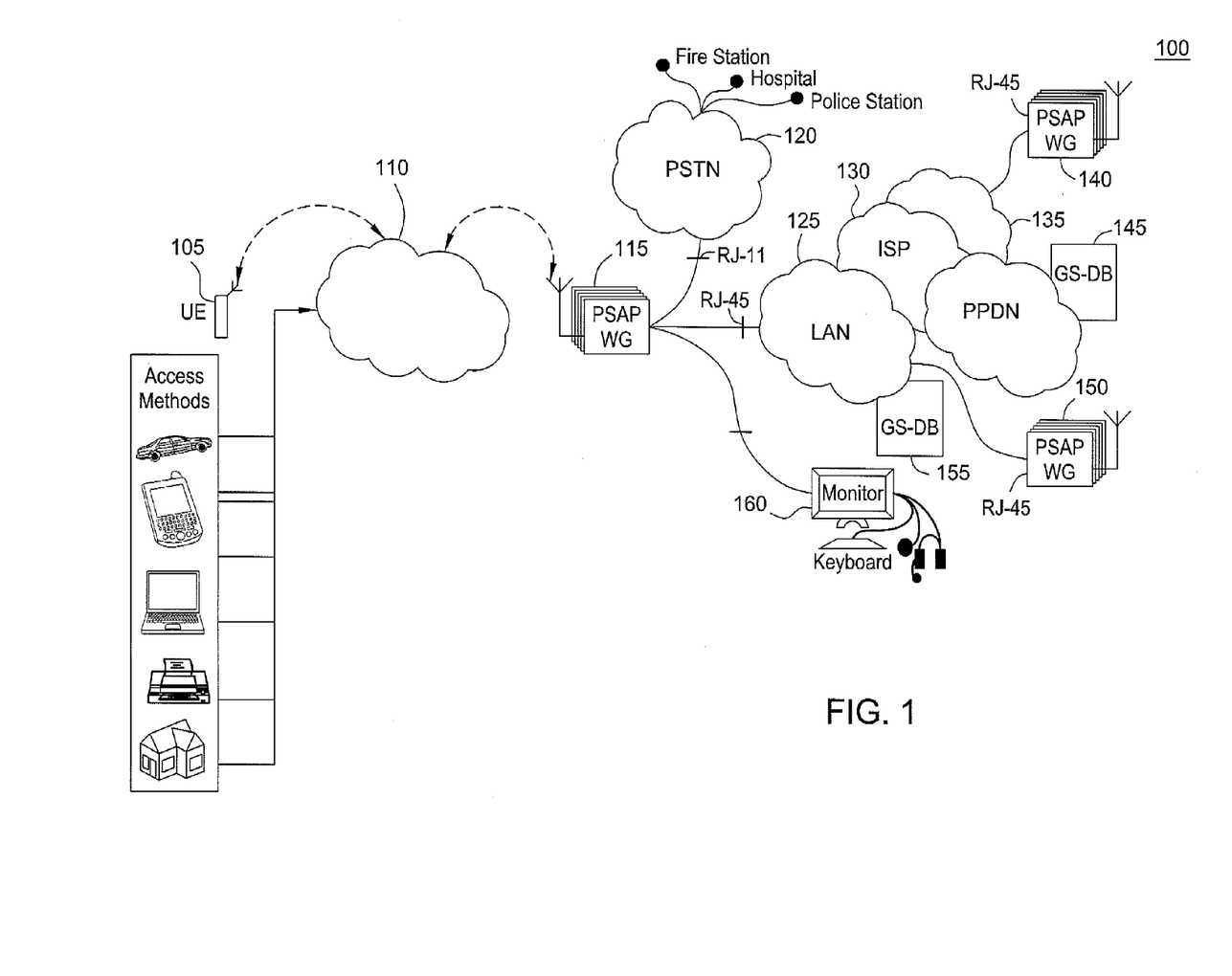
FIG. 1 depicts a high-level block diagram of a system benefiting from an embodiment.

FIG. 1 depicts a high-level block diagram of a system benefiting from an embodiment. As depicted in FIG. 1, system 100 includes user equipment (UE) 105, user access network 110, several Public Safety Answering Point (PSAP-WC) Wireless Consoles 115, 140 and 150, Public Switched Telephone Network (PSTN) (or other existing telecommunications network) 120, various other communications networks (LAN, ISP, PPDN etc.) 125, 130 and 135, Geo-Spatial Databases (GS-DB) 145 and 155, and a monitor station 160.

In one embodiment, UE 105 includes car telematics (e.g., navigator, in-dash cellular phones), wireless cellular phones, Instant Messaging (IM), email, SIP/H.323 (VoIP) capable equipment, TTY/TDD and wireline telephone system.

In one embodiment, user access network 110 comprises a mobile or cellular network such as a Code Division Multiple Access (CDMA), Global System for Mobile Communication (GSM), Universal Mobile Telecommunications System (UMTS) and/or Long Term Evolution (LTE) network including a short message service (SMS) or similar functionality. It should be noted that, while primarily described within the context of a mobile or cellular network, the invention is applicable to any mobile or cellular access technology supporting SMS or other messaging service.

In one embodiment, PSAP-WC 115 is positioned at PSAP installation complete with external antenna and connectivity to a plurality of access networks using, illustratively, wireless, RJ-11 (telephony), RJ-45 (network) or other connections. PSAP-WC 115 also connects to one or more monitor station clusters. In another embodiment, PSAP-WC 115, 140 and 150 are networked. PSAP-WC 115 is further described in reference to FIG. 2.

An exemplary PSAP-WC 115 may support one or more alerting functions, and other functions within a wired or wireless network environment. Exemplary PSAP-WC 115 is representative of one or more of a plurality of specialized hardware/software system elements for providing integrated emergency/public services such as coordinating Police, Fire, Ambulatory, and/or other Municipal first responder actions.

Figure 2:
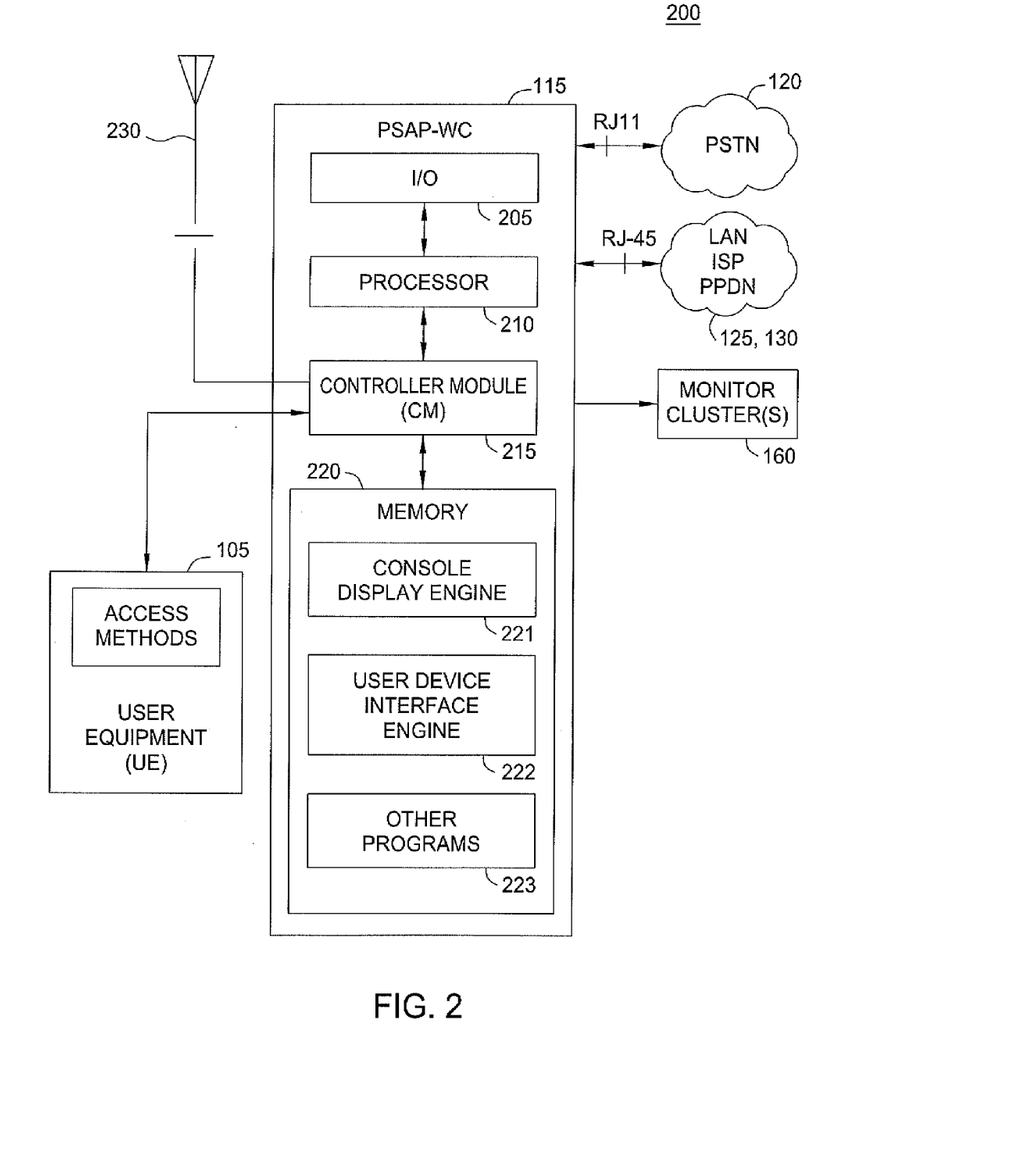
FIG. 2 depicts a high-level block diagram including an exemplary Public Safety Answering Point (PSAP) server according to an embodiment.

Exemplary PSAP-WC 115 includes a wireless network interface 230 via which the exemplary PSAP-WC may communicate with user devices (UE), which may include other access methods. Although depicted as having a single wireless network interface 230, it will be appreciated that exemplary PSAP-WC 115 may include any suitable number of wireless network interfaces.

Generally speaking, PSAP-WC 115 receives input traffic data from various input ports (not shown) from one or more prior PSAP-WC. PSAP-WC 115 serves as the origination and destination points associated with various messages that are sent to and/or received from its various network interfaces.

Generally speaking, the exemplary PSAP-WC is configured as a hardware platform that combines eight (8) RF/Baseband Transceiver trains, CPU motherboard, flash memory, peripheral controllers, and peripheral connectivity onto one hardware form factor. Mapped over this hardware is specialized application software/suite that enables translation of received Global Positioning System (GPS) latitude/longitude coordinates (via Geo-Spatial database query) into a graphic map complete with a listing of nearest emergency services. Additionally, the application software enables Public Safety staff to place a cellular call, and/or a landline dispatch call to a Public Safety service.

The monitor station 160 may operate as a remote unit with respect to the PSAP-WC 115. The monitor station 160 may comprise a presentation device or display device adapted to present information relevant to the functions of the PSAP-WC 115. The monitor station may be staffed with emergency services personnel, third-party security personnel and the like. The monitor station 160 may include audio headsets, voice/telephony input mechanisms and so on as known to those skilled in the art.

In some embodiments there is no monitor station 160. That is, in various embodiments the functions of the PSAP-WC 115 are totally automated, unmonitored functions adapted to rapidly deploy emergency services resources as quickly as possible in response to an emergency request.

Public Switched Telephone Network (120) comprises telephone lines, fiber optic cables, microwave transmission links, communications satellites and/or undersea telephone cables interconnected by switching centers as is well known. PSTN 120 is depicted as providing a link to Fire Station Dispatch, Hospital/Ambulatory Dispatch and Police Station Dispatch, though other communications systems and/or technologies may be used for this purpose. For example, these emergency services related facilities may also support one or more of the various other communications technologies discussed herein. As such, in various embodiments these emergency services related facilities are connected directly to the computer networks associated with PSAP, GS-DB and/or monitor station functional elements.

The multiple communications networks 110, 120, 125, 130, 135 and so on depicted in FIG. 1 are intended to convey the versatility of the various embodiments. In particular, as technology progresses the specific types of communications networks used in the various bodies will change. For example, over time the PSTN 120 will be phased out in favor of other network technologies. Similarly, the LAN 125, ISP 130, PPDN 135 and so on are depicted as a group of communications networks for the purpose of conveying the flexibility of the various embodiments with respect to using different communication technologies.

Local Area Network (LAN) 125 provides Intranet connectivity supporting distributed Geo-Spatial Database 145, 155. LAN 125 comprises ARCNET, Token Ring, Ethernet over twisted pair cabling and WiFi technologies. In another embodiment, LAN 125 includes metropolitan area network (MAN) and wide area network (WAN). The infrastructure enables real-time translation of latitude/longitude coordinates into displayable maps complete with physical address and closest emergency service providers.

Network 130 includes Internet Protocol Transmission Control Protocol network (IP/TCP) and the like and network 135 includes public packet data network (PPDN) and the like. In another embodiment, user access network 110 includes cloud computing. Network 130 provides Internet connectivity supporting dispersed Geo-Spatial Database 145, 155 and IMS SIP Dispatch. The infrastructure enables real-time translation of latitude/longitude coordinates into displayable maps complete with physical address and closest emergency service providers.

GS-DB 145 and 155 include Geo-Spatial Database for location acquisition. While primarily described within the context geo-spatial database, it will be appreciated by those skilled in the art that other means of location acquisition may be employed. For example, Mobile Positioning Center (MPC)/Position Determining Entity (PDE) connectivity may be employed.

FIG. 2 depicts a high-level block diagram including an exemplary Public Safety Answering Point (PSAP) server according to an embodiment. Specifically, the PSAP 200 depicted in FIG. 2 may be used to implement any of the PSAP functions described above with respect to FIG. 1.

The various embodiments, the PSAP is adapted to receive SMS messages via a SMS receiver. Existing mobile or cellular network transport layer infrastructure provides a short message service (SMS) that may be utilized within the context of the various embodiments. Various other messaging services may also be utilized instead of SMS.

In various embodiments, improve reliability is provided by co-locating PSAPs and base stations, eNodeBs and the like (depending upon the mobile network technology used).

In various embodiments, a group of ANI/DN is reserved and assigned to municipality PSAP centers. ANI/DN is required to tether both ends of the bi-directional SMS dialog between a client and the PSAP Wireless Console. Tethering ensures a one-to-one association between the client and the PSAP-WC handling the emergency.

As depicted in FIG. 2, exemplary PSAP-GW 115 includes I/O circuitry 205, a processor 210, and a memory 220. Processor 210 is adapted to cooperate with memory 220, I/O circuitry 205 and one or more communication interfaces to provide various alerting functions for the users.

I/O circuitry 205 is adapted to facilitate communications with peripheral devices both internal and external to processor 210. For example, I/O circuitry 205 is adapted to interface with memory 220. Similarly, I/O circuitry 205 is adapted to facilitate communications with Controller Module (CM) 215, Console Display Engine 221, User Device Interface Engine (UDIE) 222, and the like. In various embodiments, a connection is provided between processor ports and any peripheral devices used to communicate with other PSAP elements.

Although primarily depicted and described with respect to Controller Module (CM) 215, Console Display Engine 221, User Device Interface Engine (UDIE) 222, it will be appreciated that I/O circuitry 205 may be adapted to support communications with any other devices suitable for providing the alerting services associated with the PSAP functions herein described.

Memory 220, generally speaking, stores data and software/suite programs that are adapted for use in providing various computing functions within the PSAP-WC system. The memory includes Controller Module (CM) 215, Console Display Engine 221, User Device Interface Engine (UDIE) 222, and OTHER programs.

In one embodiment, Controller Module (CM) 215, Console Display Engine 221, User Device Interface Engine (UDIE) 222 are implemented using software instructions which may be executed by processor (e.g., controller 210) for performing the various functionalities depicted and described herein.

Although depicted and described with respect to an embodiment in which each of the engines is stored within memory 220, it will be appreciated by those skilled in the art that the engines may be stored in one or more other storage devices internal to PSAP-WC and/or external to PSAP-WC 115. The engines may be distributed across any suitable numbers and/or types of storage devices internal and/or external to PSAP-WC. Memory 220, including each of the engines and tools of memory 220, is described in additional detail herein below.

Although primarily depicted and described herein with respect to specific functions being performed by and/or using specific ones of the engines of memory 220, it will be appreciated that any of the virtual desktop monitoring functions depicted and described herein may be performed by and/or using any one or more of the engines of memory 220.

In various embodiments, Control Module (CM) 215 performs routing and connectivity functions for PSAP alert system 100. CM 215 is further discussed in reference to FIG. 3.

In various embodiments, Console Display Engine (CDE) 221 performs the display functions of the Wireless PSAP Console. For example, the display shows the location of an emergency, the unique identifier assigned and various data points.

In various embodiments, User Device Interface Engine (UDIE) 222 performs the functions associated with the e911 silent alert application. For example, when the user invokes a perimeter alert function, the User Device Interface Engine (UDIE) 222 performs all the interface functions. The application interface is pre-programmed/assigned by end-user. Internetworking interface conveys end-user name, home address, primary/secondary telephone number(s), GPS longitude/latitude, altitude above sea level, type of emergency code, and need for a callback every δ seconds.

Figure 3:
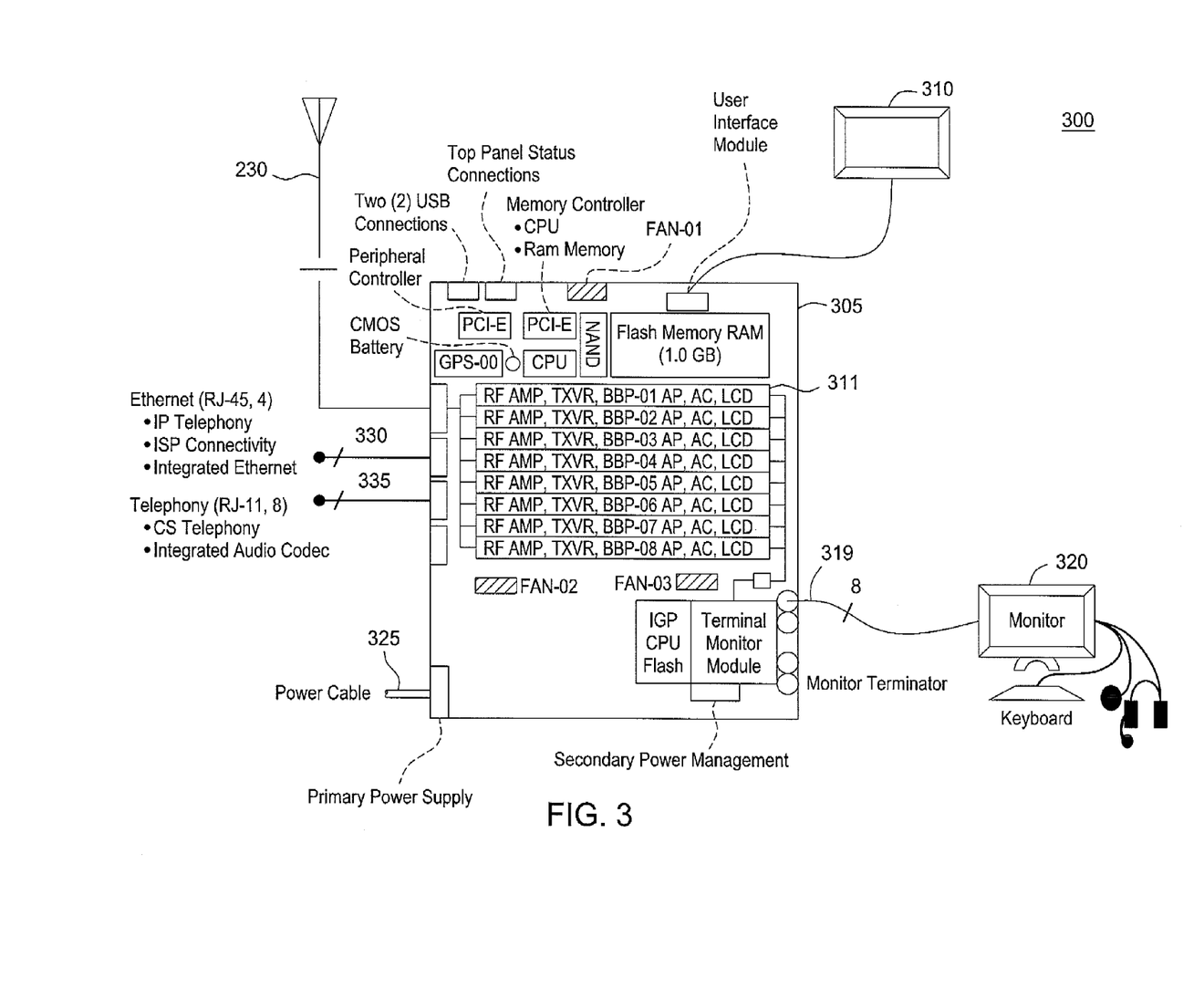
FIG. 3 depicts a Single Board Schematic Layout according to an embodiment.

FIG. 3 depicts a Single Board Schematic Layout according to an embodiment. Generally, the major functions of the board are accomplished via a hardware platform that combines, illustratively, eight (8) RF/Baseband Transceivers, CPU motherboard, flash memory, peripheral controllers, and peripheral connectivity onto one hardware form factor. More or fewer elements may be provided within the context of the various embodiments. Mapped over this hardware is specialized application software/suite that enables translation of received GPS latitude/longitude coordinates (via Geo-Spatial database query) into a graphic map complete with a listing of nearest emergency services. Additionally the application software enables Public Safety staff to place a cellular call, and/or a landline dispatch call to a Public Safety service. The hardware form factor combines personal computer (pc) motherboard technology with cellular handheld RF Transceiver/Baseband processor.

Single Board Block Diagram 300 comprises an antenna 230, Circuit Board Chassis 305, Touch Screen 310, RF Transceiver/Baseband Processor Board 311, RJ-45 connector 330, RJ-11 connector 335, Power Cable 325, Monitor Station Terminator 319, Monitor Station 320.

In various embodiments, the PSAP platform or server receives, translates and presents alert, complete with bi-directional SMS and Voice-Circuit Switched (CS), or Voice-Packet Switched (PS) capability. Circuit Board Chassis 305 is a typical circuit board housing the different components herein described.

In one embodiment, antenna 230 is a common antenna, which is adapted for CDMA, GSM, LTE, UMTS, GPS reception and the like.

In another embodiment, an antenna array is implemented. In one embodiment, Touch Screen 310 provides setup/status functions, e.g., calendar/time, RF Transceiver setup, System Level setup/status. Although depicted as providing setup/status functions, it will be appreciated that Touch Screen 305 may include any suitable number of functions and/or interfaces.

In one embodiment, the single board represented by Single Board Block Diagram 300 includes eight (8) RF Transceiver/Baseband Processor Board 311 each of which includes Radio Frequency (RF) Amplifier, Transceiver (TXVR), Base Band Processor (BBP), Application Processor (AP), Audio CODEC (AC), Liquid Crystal Display Driver (LCD). In another embodiment, a suitable arrangement is implemented.

In one embodiment, RJ-45 connector 330 comprises, illustratively, four (4) interfaces for IP Telephony, ISP connectivity and Integrated Ethernet for example. In another embodiment, other interfaces are accommodated.

In one embodiment, RJ-11 connector 335 includes eight (8) interfaces for Telephony, CS Telephony and Integrated Audio CODEC, for example. In another embodiment, other interfaces are accommodated.

In one embodiment, Monitor Station Terminator 319 comprises, illustratively, eight (8) connectors from the Terminator Monitor Module, which connects to eight (8) independent LCD controllers. In another embodiment, Terminator Monitor Module connects to external Monitor Station clusters 320. In yet another embodiment, Terminator Monitor Module tethers power to external terminal clusters.

Figure 4:
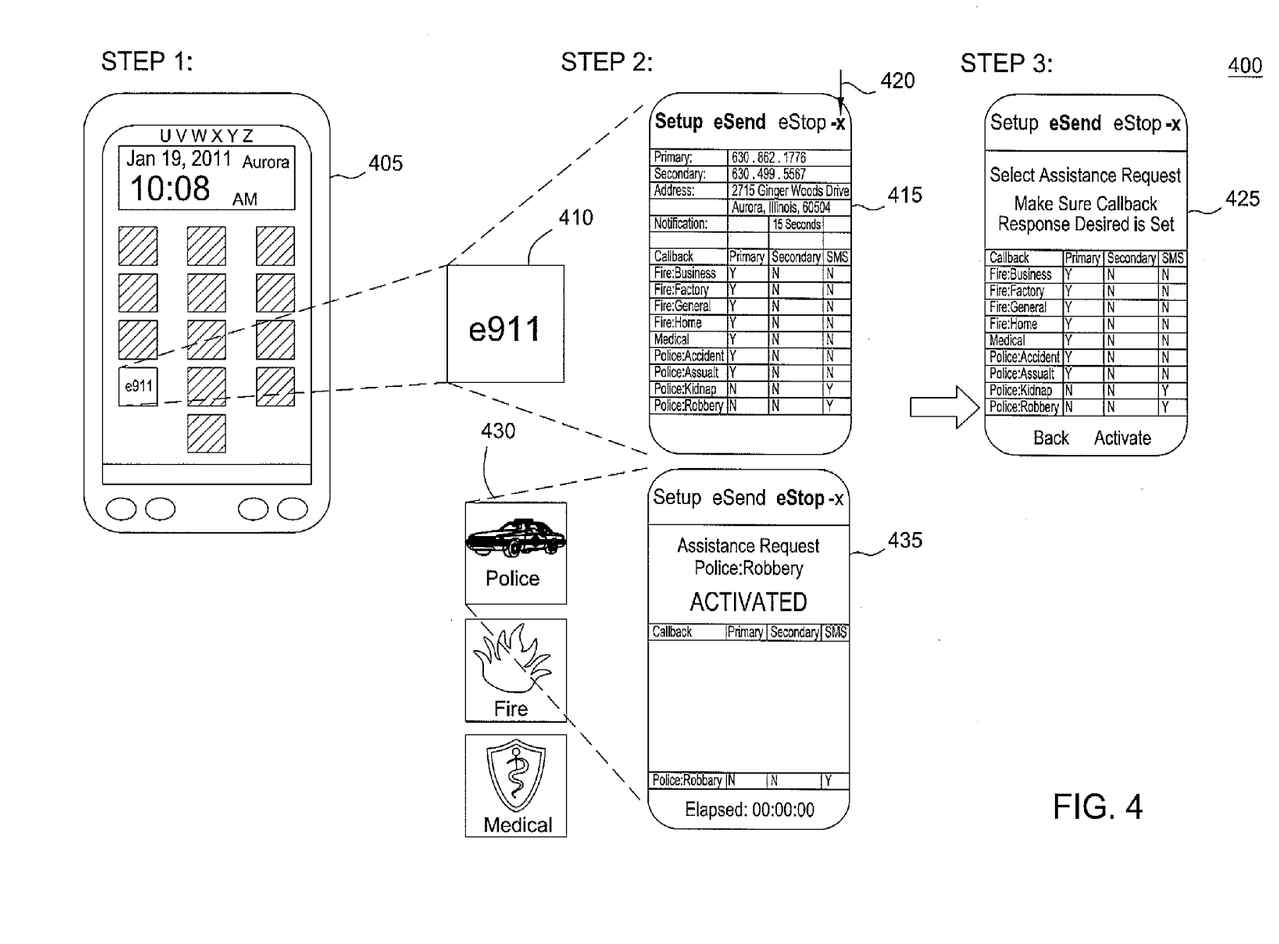
FIG. 4 depicts an exemplary hand held device equipped with an e911 silent alert application.

FIG. 4 depicts an exemplary hand held device equipped with an e911 silent alert application. In one embodiment, three (3) steps are needed to activate the e911 silent alert application. Step 1 is to tap application 410 displayed in handheld device 405. In this embodiment, the application initial pane is displayed and occupies the entire screen area. The information is shown in "Grayed" "Read Only" mode. There are two options in this mode; namely, Setup and eSend (the eStop command is inactive). Setup is described below in the context of a different embodiment. Step 2 is to tap eSend shown on top of screen 415. In the eSend mode shown in 425, the application initial pane is still displayed. Information is shown in "Grayed" text "Read Only" mode. Two (2) commands are disabled; namely, Setup, eStop. The confirmation pane displayed. The desired Assistance Request is selected via tapping, for example "Police:Robbery" 430. The desired callback response is verified, for example SMS only.

In one embodiment, the SMS envelope is implemented using the encoded format. Illustratively, in this embodiment the total number of characters comprises 90 Bytes or 80 Bytes encrypted/zipped. The fields include Title, UniqueID, Primary Telephone Number, Secondary Telephone Number, Address, AddressLatitude, AddressLongitude, CurrentLatitude, CurrentLongitude, CurrentAltitude, Cadence and Type. In another embodiment, the SMS envelope is implemented using the un-encoded format. Illustratively, in this embodiment the total number of characters comprises 361 Bytes. The fields include Title, UniqueID, Primary Telephone Number, Secondary Telephone Number, Address, AddressLatitude, AddressLongitude, CurrentLatitude, CurrentLongitude, CurrentAltitude, Cadence and Type. In another embodiment, the callback response is any method the user opts for, e.g., Facebook, AOL Instant Messenger, Yahoo Instant Messenger, Twitter and the like.

As indicated above, in a different embodiment the user has the option to select Setup shown on top of screen 415. The application initial pane is still displayed. Information shown is in "Black" text "Edit" mode. In this mode, the pane may be minimized or closed by selecting item 420. Each information field may be edited with the exception of Primary Telephone Number (handheld's) and the code for emergency type. These fields are not displayed. The information fields include (1) Home Address (Street, State, Zip); (2) Notification Rate, e.g., every 5, 10, 15, 30 and 60 seconds; and (3) Callback Boolean to indicate to e911 dispatcher reciprocating clarity action. Three (3) commands are disabled: Setup, eSend, eStop. The user may select "Save" to save any changes made. Otherwise, the user may return to the previous screen by selecting "Back."

Figure 5:
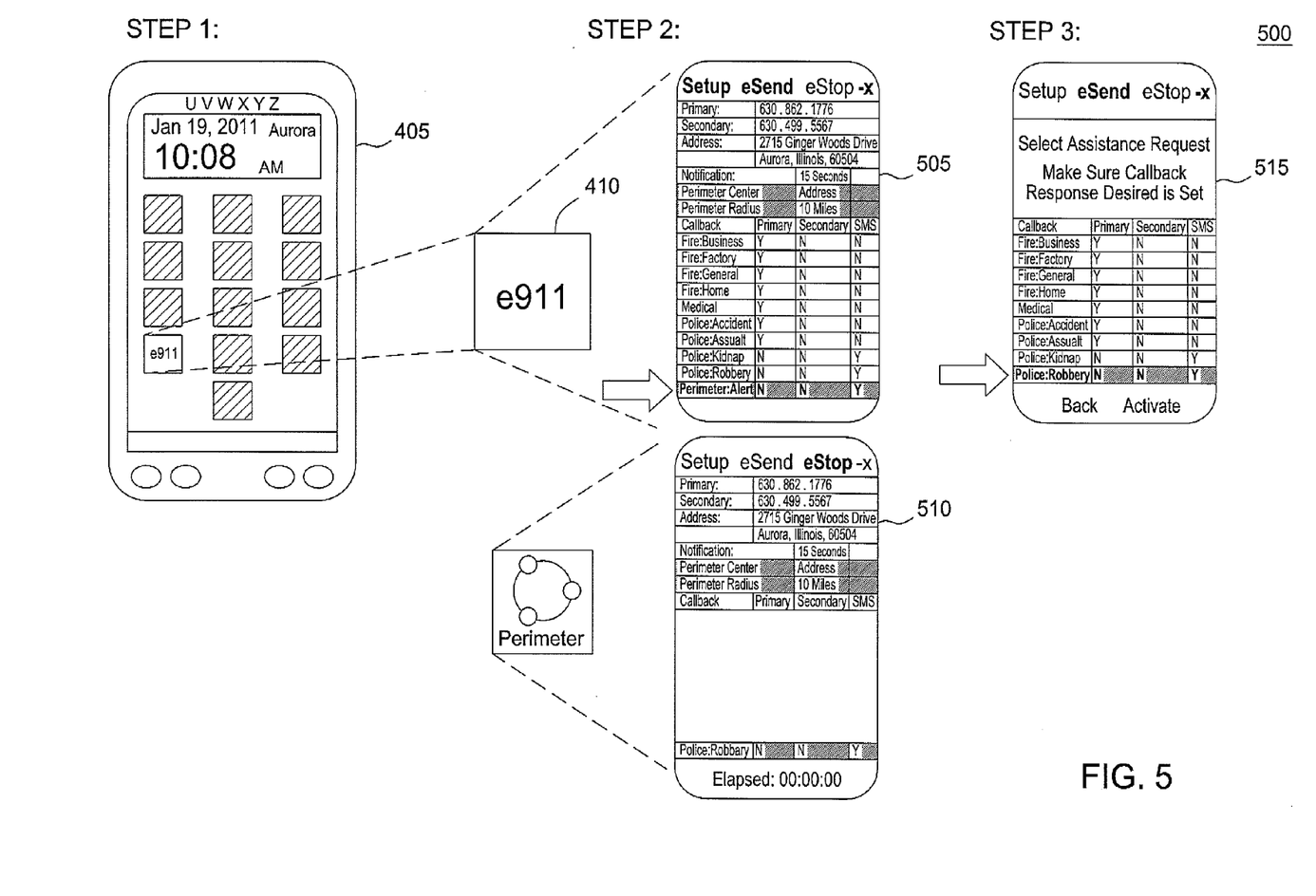
FIG. 5 depicts an exemplary hand held device equipped with an Activated e911 silent alert application in Perimeter Alert mode.

FIG. 5 depicts an exemplary hand held device equipped with an Activated e911 silent alert application in Perimeter Alert mode. The e911 application enables the end-user to silently relay a perimeter violation alarm by numerical code to a 911 dispatcher.

The e911 application wakes every $\sigma$ seconds (in real-time) to check current GPS position with perimeter center, radius, and bias. Notification is sent if the application and Perimeter:Alert are activated. The Perimeter Alert mode may be activated locally or remotely. The remote trigger option allows a registered individual to call the PSAP to request that a location trigger be sent to the device to initiate the Location Based Alert/Alarm.

The application interface includes four (4) additional parameters; namely, (1) Perimeter Center; (2) Perimeter Radius; (3) Autonomous Trigger Flag; and (4) Perimeter Alert. Perimeter Center refers to what point in geo-physical space should be used as the center reference point for defining the perimeter. Perimeter Center includes two sub-categories: "Address" is the address given as home address, which is translated into GPS snapshot and used and "This Spot" is the immediate GSP snapshot, which is taken and used. Perimeter Radius is the distance (miles/kilometers) from the center that defines the perimeter circle. Perimeter Radius also includes two subcategories: Pre-assigned bias of 0.25 to 0.50 mile/kilometer and range values 1, 2, 3, 5, 10, 25, 50, 100. The Autonomous Trigger Flag is enabled by the application for a perimeter auto check every 30 minutes or so. For example, an inactive application may "wake up" every 30 minutes and take/store a snapshot of the GPS position, camera input, audio input, and/or other device input. Similarly, an active application may take a similar snapshot at this or any other time interval, or in addition to predefined events. The emergency code type is Perimeter Alert.

As discussed above in the context of the Police:Robbery embodiment, in this embodiment, three (3) steps are also needed to activate the e911 silent alert application. Step 1 is to tap application 410 displayed in handheld device 405. In this embodiment, the application initial pane 505 is displayed and occupies the entire screen area. The information is shown in "Grayed" "Read Only" mode. Information is shown in "Grayed" text "Read Only" mode. Three interfaces are shown, Perimeter Center, Perimeter Radius and Autonomous Trigger Flag. The type of assistance requested in this mode is Perimeter:Alert 510. Step 2 is to tap eSend shown on top of screen 505. This action activates screen 515. Two (2) commands are disabled; namely, Setup, eStop. The confirmation pane displayed. The desired Assistance Request is selected via tapping, for example "Perimeter: Alert" 510. The desired callback response is verified, for example SMS as described above. In another embodiment, the callback response is any messaging or other communications method appropriate for the user, such as provided by commercial services including Facebook, AOL Instant Messenger, Yahoo Instant Messenger, Twitter and so on.

Figure 6:
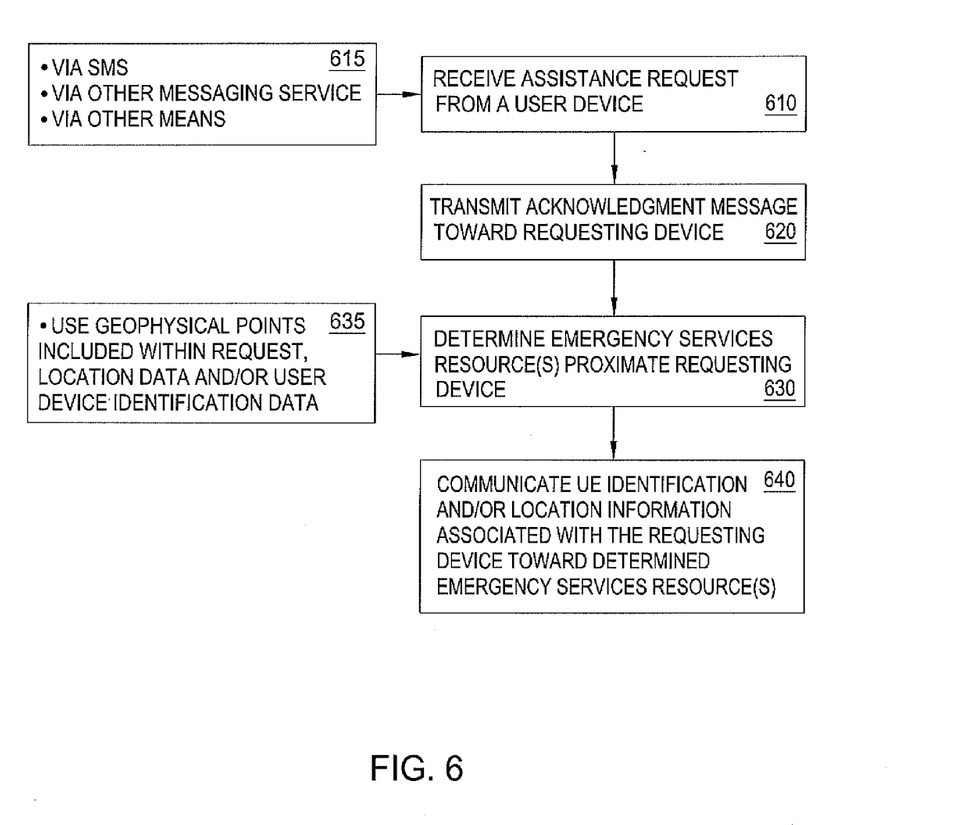
FIG. 6 depicts a flow diagram of a method according to one embodiment.

FIG. 6 depicts a flow diagram of a method according to one embodiment. Specifically, FIG. 6 depicts a method suitable for use at a PSAP or other entity operative to provide assistance or other information to emergency services resources proximate the user-initiated request for assistance.

At step 610, the PSAP or other entity receives an assistance request message from a user device. The assistance request message includes geophysical points associated with the requesting device. In various embodiments the assistance request message also includes identification associated with the requesting user device, GPS or other location data associated with the user device and so on as discussed herein.

Referring to box 615, the assistance request may be received via SMS, via another message service, or via some other means (illustratively, third-party message, machine to machine (M2M) dedicated channel, IP network and so on. Generally speaking, any means of conveying an alert message to the PSAP may be used.

At step 620, an acknowledgment message is transmitted toward the requesting device. The acknowledgment message may be transmitted via SMS, another message service, or via some other means.

At step 630, emergency services resources proximate the requesting device are determined. Referring to box 635, this determination is made using geophysical points, location data and/or user device identification data included within the assistance request.

At step 640, UE identification and/or location information associated with the requesting device is communicated towards the emergency service resource(s) proximate the requesting device.

The various steps described herein with respect to FIG. 6 implement a silent e911 service wherein, illustratively, a dedicated button or key sequence activated via a user device automatically triggers an assistance request which, in turn, is processed by a PSAP or other entity to identify the location of the requesting device and direct the request toward those emergency services resources best position to address the emergency.

Figure 7:
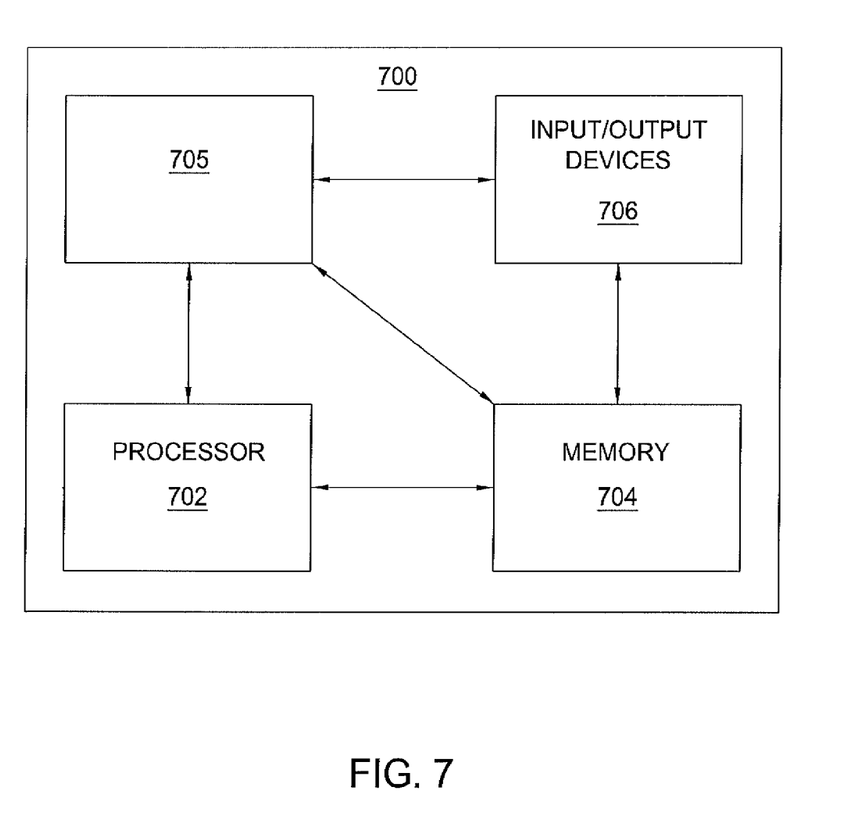
FIG. 7 depicts a high-level block diagram of a computing device suitable for use in implementing various functions described herein.

FIG. 7 depicts a high-level block diagram of a computing device suitable for use in implementing various functions described herein. Specifically, as depicted in FIG. 7, computer 700 includes a processor element 702, (e.g., 115, a central processing unit (CPU) and/or other suitable processor(s)), a memory 704 (e.g., 220, random access memory (RAM), read only memory (ROM), and the like), a cooperating module/process 705, and various input/output devices 706 (e.g., 205, a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 705 may be loaded into memory 704 and executed by processor 702 to implement the functions as discussed herein. Thus, cooperating process 705 (including associated data structures) may be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, and/or stored within a memory within a computing device operating according to the instructions.

Although various embodiments which incorporate the teachings of the present invention have been shown and described in detail herein, those skilled in the art may readily devise many other varied embodiments that still incorporate these teachings.

What is claimed is:

1. A method for automatically generating an emergency services alert, comprising:
   receiving, at a public safety answering point (PSAP), a request for assistance message including a predefined code of a requested emergency type and including identification and location information associated with a user device, the requested emergency type being indicative of at least one of a medical emergency, a fire emergency, or a police emergency;
   determining, at the PSAP using the location information associated with the user device and the predefined code of the requested emergency type, emergency services resources from a group including at least one of medical resources, fire resources, and police resources, wherein the determined emergency services resources correspond to the requested emergency type and are proximate the user device;
   communicating, by the PSAP, the identification and location information associated with the user device toward the determined emergency services resources; and
   determining, at the PSAP based on the request for assistance message and callback information associated with the predefined code of the requested emergency type, whether to initiate a return call responsive to the request for assistance message, wherein the callback information comprises, for each of two or more callback numbers, a respective Boolean value indicative as to whether or not callback via the respective callback number is permitted.

2. The method of claim 1, further comprising:
   transmitting an acknowledgement message toward the user device.

3. The method of claim 1, further comprising:
transmitting a command toward the user device, wherein the command is adapted to put the user device into a silent mode of operation.

4. The method of claim 2, wherein one or both of the request for assistance message and the acknowledgment message are transmitted using a short message service (SMS).

5. The method of claim 2, wherein the acknowledgement message is adapted to establish a message-based interaction with the user device, wherein the PSAP utilizes the message-based interaction to request further information from the user device.

6. The method of claim 5, wherein said further information comprises one or more of identification information, geophysical point data, global positioning system (GPS) coordinates, motion information, image data, audio data, device status information, or network status information.

7. The method of claim 1, further comprising:
receiving, at the PSAP, at least one additional message from the user device, the at least one additional message including one or more of identification information, geophysical point data, global positioning system (GPS) coordinates, motion information, image data, audio data, device status information, or network status information.

8. The method of claim 5, wherein the message-based interaction between the PSAP and the user device is supported by an application executed on the user device.

9. The method of claim 8, wherein the application is adapted to periodically sample one or more of parameters of one or more of geophysical point data, global positioning system (GPS) coordinates, motion information, image data, audio data, device status information, or network status information.

10. The method of claim 9, wherein the one or more periodically sampled parameters is stored at the user device and, in response to a command transmitted by the PSAP, forwarded from the user device to the PSAP via a communication link.

11. The method of claim 10, wherein the communication link comprises one of a short message service (SMS) or an Internet Protocol (IP) network.

12. The method of claim 1, wherein the location information comprises one or more of perimeter center information, perimeter circle information, longitude information, latitude information, or altitude information.

13. The method of claim 1, wherein communicating the identification and location information associated with the user device toward the determined emergency services resources uses one or more of a messaging service, a Voice-Circuit Switched (CS) service, or a Voice-Packet Switched (PS) service.

14. The method of claim 1, further comprising:
transmitting a command toward the user device, wherein the command is adapted to enable the user device to relay a perimeter violation alarm.

15. The method of claim 1, further comprising:
assisting in making a return phone call from the PSAP to one of the callback numbers when the respective Boolean value for the respective one of the callback numbers indicates that the return phone call is to be made.

16. The method of claim 1, wherein the callback information comprises, for a text-based callback type, a respective Boolean value indicative as to whether or not callback via the text-based callback is permitted.

17. The method of claim 1, further comprising:
initiating the return call responsive to a determination to initiate the return call.

18. The method of claim 1, further comprising:
receiving the callback information associated with the predefined code of the requested emergency type at predetermined time intervals.

19. An apparatus for generating an alert, the apparatus comprising:
a public safety answering point (PSAP) server adapted to provide alerting functions according to a PSAP server suite;
the PSAP server comprising:
a plurality of Baseband Transceivers supporting communication with other PSAP servers; and
at least one messaging interface supporting message-based interaction with one or more user devices;
the PSAP server configured to:
receive a request for assistance message including a predefined code of a requested emergency type and including identification and location information associated with a user device, the requested emergency type being indicative of at least one of a medical emergency, a fire emergency, or a police emergency;
determine, using the location information associated with the user device and the predefined code of the requested emergency type, emergency services resources from a group including at least one of medical resources, fire resources, and police resources, wherein the determined emergency services resources correspond to the requested emergency type and are proximate the user device;
communicate the identification and location information associated with the user device toward the determined emergency services resources; and
determine, based on the request for assistance message and callback information associated with the predefined code of the requested emergency type, whether to initiate a return call responsive to the request for assistance message, wherein the callback information comprises, for each of two or more callback numbers, a respective Boolean value indicative as to whether or not callback via the respective callback number is permitted.

20. A non-transitory computer-readable storage medium storing software instructions which, when executed by a processor, cause the processor to perform a method for automatically generating an emergency services alert, the method comprising:
receiving, at a public safety answering point (PSAP), a request for assistance message including a predefined code of a requested emergency type and identification and location information associated with a user device, the requested emergency type being indicative of at least one of a medical emergency, a fire emergency, or a police emergency;
determining, at the PSAP using the location information associated with the user device and the predefined code of the requested emergency type, emergency services resources from a group including at least one of medical resources, fire resources, and police resources, wherein the determined emergency services resources correspond to the requested emergency type and are proximate the user device;

communicating, by the PSAP, the identification and location information associated with the user device toward the determined emergency services resources; and determining, at the PSAP based on the request for assistance message and callback information associated with the predefined code of the requested emergency type, whether to initiate a return call responsive to the request for assistance message, wherein the callback information comprises, for each of two or more callback numbers, a respective Boolean value indicative as to whether or not callback via the respective callback number is permitted.

21. A system for automatically generating an emergency services alert, the system comprising:

at least one geo-spatial database (GS-DB); and at least one public safety answering point (PSAP) server adapted to provide alerting functions according to a PSAP server suite;

the PSAP server comprising:

a plurality of Baseband Transceivers supporting communication with other PSAP servers; and at least one messaging interface supporting message-based interaction with one or more user devices;

the PSAP server configured to:

receive a request for assistance message including a predefined code of a requested emergency type and including identification and location information associated with a user device, the requested emergency type being indicative of at least one of a medical emergency, a fire emergency, or a police emergency;

determine, using the location information associated with the user device and the predefined code of the requested emergency type, emergency services resources from a group including at least one of medical resources, fire resources, and police resources, wherein the determined emergency services resources correspond to the requested emergency type and are proximate the user device;

communicate the identification and location information associated with the user device toward the determined emergency services resources; and determine, based on the request for assistance message and callback information associated with the predefined code of the requested emergency type, whether to initiate a return call responsive to the request for assistance message, wherein the callback information comprises, for each of two or more callback numbers, a respective Boolean value indicative as to whether or not callback via the respective callback number is permitted.

\* \* \* \* \*